Dec. 29, 1925.
M. KLEIN
TRACTION SHOE
Filed Dec. 6, 1923
1,567,275
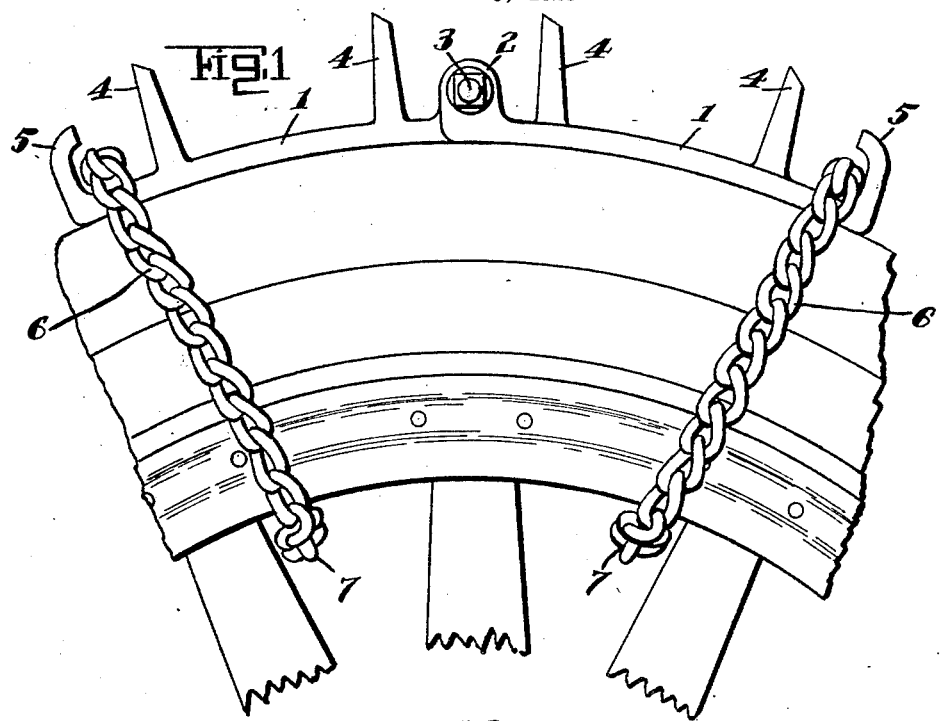
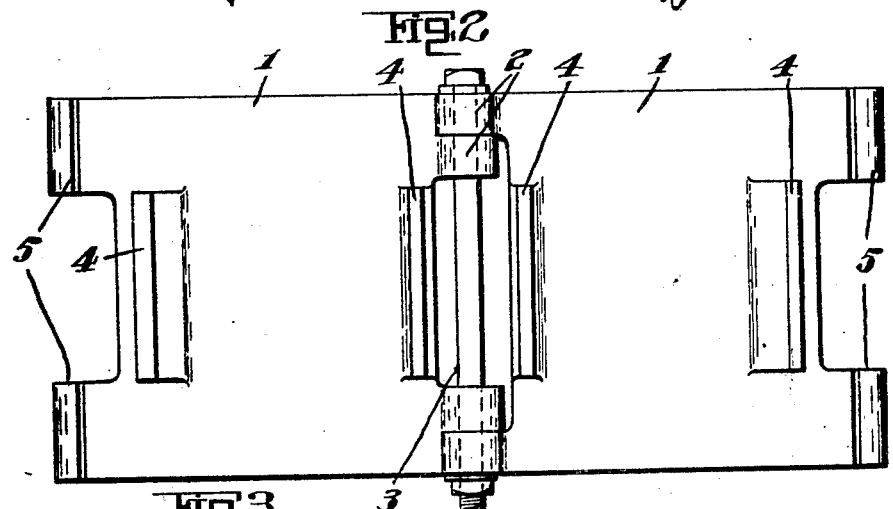
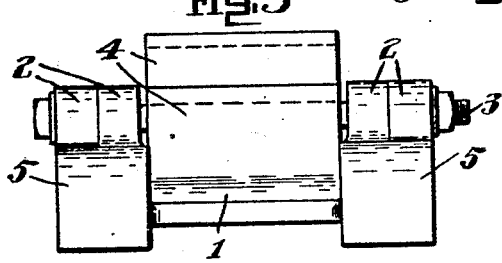
Inventor
Mack Klein
By Attorney Patented Dec. 29, 1925.

1,567,275

UNITED STATES PATENT OFFICE.

MACK KLEIN, OF REVERE, MASSACHUSETTS.

TRACTION SHOE.

Application filed December 6, 1923. Serial No. 679,023.

*To all whom it may concern:*

Be it known that I, MACK KLEIN, a citizen of the United States, residing at Revere, county of Suffolk, Commonwealth of Massachusetts, have invented certain new and useful Improvements in Traction Shoes, of which the following is a specification.

This invention relates to traction devices and particularly to a traction shoe or plate adapted to be applied to a tire under emergency conditions, such as snow, deep mud, soft ground or the like. In such devices great difficulty has been experienced in obtaining sufficient positive contact with the ground without having too cumbersome or too expensive an article. Another important feature is the matter of ready adjustability and detachability.

For the purposes of disclosure of my invention I have selected a form which is well adapted to practical use while at the same time being simple and convenient. Throughout the specification and drawings like reference characters are employed to indicate corresponding parts and in the drawings:

Fig. 1 shows a portion of a wheel rim with the traction shoe attached thereto in accordance with my invention.

Fig. 2 is a plan view of the shoe removed, and

Fig. 3 is an end elevation of the same.

My shoe comprises a pair of plates 1. On the adjacent ends of the plates are formed ears 2 through which pass connecting bolt or other fastening 3. This connection permits the plates 1 to assume tangent planes for a considerable variation in wheel diameter. On each plate 1 I form a plurality of fins or blades 4. These may be disposed transversely of the plate as shown or may be inclined or staggered or otherwise disposed as may be desired.

At their outer ends the plates 1 are provided with hooked members 5 adapted to form stops for the chains 6. The chains 6 have interchangeable end hooks 7 so that they can be passed over the plate and around the tire and felloe. Any number of these shoes or plates may be used as desired for emergency use, as in a small mud hole, one plate might prove sufficient. For more extensive use as in long stretches of mud or on snow covered roads the number of shoes or plates might be increased. As will be seen from the drawings, the plates are very easily applied and as readily detachable so that it is not necessary to drive over hard surfaces of road with the blades or fins exposed.

It will be obvious to those skilled in the art that the number of plates and the number of articulations may be multiplied and if desired such plates might be formed as a continuous band which would entirely encircle the tire. The plates may be made in any width and the blades of any length according to the conditions that they are intended to meet.

All these various modifications are to be understood as contemplated by my invention if within the limits of the appended claims.

What I therefore claim and desire to secure by Letters Patent is:

1. A traction device of the class described, comprising a pair of plates hinged to each other at one end, each plate at its opposite end being provided with a pair of spaced alined hooks and with a vertical upstanding rib extending parallel to the plane of said hooks and inset from the end of the plate, and a pair of chains disposed across the free ends of said plates in the space between said hooks and said last-named ribs for anchoring the traction device in position.

2. A traction device of the class described, comprising a pair of plates hinged to each other at one end, each plate at its hinge end being provided with a recess, a pair of alined pintles at the ends of said recess, and a vertical upstanding rib extending adjacent said recess and parallel thereto, a pintle set through the alined ears of said plates and spanning said recesses, and each plate at its opposite end being provided with a pair of spaced alined hooks and with a vertical upstanding rib extending parallel to the plane of said hooks and inset from the end of the plate, and a pair of chains disposed across the free ends of said plates in the space between said hooks and said last-named ribs for anchoring the traction device in position.

In testimony whereof I affix my signature.

MACK KLEIN.